United States Patent [19]

Smith

[11] Patent Number: 4,921,153

[45] Date of Patent: May 1, 1990

[54] BLADE BAG FOR BLADES USED WITH A CIRCULAR SAW

[76] Inventor: Richard Smith, 4171 33rd St., #2, San Diego, Calif. 92104

[21] Appl. No.: 357,100

[22] Filed: May 26, 1989

[51] Int. Cl.$^5$ .............................................. A45F 5/00
[52] U.S. Cl. .................................. 224/253; 224/249; 224/904; 224/237; 206/349; 206/303
[58] Field of Search ............... 224/191, 249, 252, 253, 224/904, 236, 228, 237, 240, 235, 911; 206/349, 352, 353, 303, 372, 311, 312; 383/907, 86; 150/127–130; 190/124–127

[56] References Cited

U.S. PATENT DOCUMENTS

| | | | |
|---|---|---|---|
| 2,367,440 | 1/1945 | Schieman | 224/901 |
| 2,471,173 | 5/1949 | Taylor | 206/349 |
| 2,513,575 | 7/1950 | Lombard | 224/235 |
| 3,212,690 | 10/1965 | Green | 224/904 |
| 4,273,276 | 6/1981 | Perkins | 224/911 |
| 4,418,733 | 12/1983 | Kallman | 224/901 |
| 4,421,150 | 12/1983 | Masters | 383/86 |

*Primary Examiner*—Henry J. Recla
*Assistant Examiner*—Keith Kupferschmid
*Attorney, Agent, or Firm*—Charles C. Logan, II

[57] ABSTRACT

A blade bag for carrying blades used with a circular saw in a pocket formed between its front wall member and its rear wall member. The rear wall member has a lower major portion formed with a fold line at its top edge. A rear wall flap member extends upwardly from this fold line. The front wall member also has a lower major portion that extends upwardly to its fold line. A front wall member extends upwardly from this fold line. The front and rear wall members are fastened to each other around a perimeter from the opposite ends of the fold line of the front wall member down around its bottom edge. When the blade bag is in its closed state, the front wall flap member is folded upwardly and it hides from view and access the saw blades removably positioned within the pocket of the blade bag. Also in this closed state, the rear wall flap member is folded downwardly about its fold line so that it covers the front surface of the front wall flap member. When it is desired to remove the blades, the rear wall flap member is folded upwardly about its fold line and the front wall flap member is folded downwardly about its fold line. This exposes most of the top half of the saw blades making them easily removable.

7 Claims, 2 Drawing Sheets

BLADE BAG FOR BLADES USED WITH A CIRCULAR SAW

BACKGROUND OF THE INVENTION

The invention relates to a bag and more specifically to a blade bag for blades used with circular saws.

Presently, carpenters working on construction projects such as residential homes and commercial buildings often use a circular saw for cutting wood members. Usually the carpenter using the saw will not carry a spare blade with him and when the blade becomes dull or it breaks, it is necessary for the carpenter to return to the tool dispensing area or to a vehicle where spare blades are stored. Most of the time this causes a loss of time because the carpenter has to climb down from the structure being erected and walk to his supply area.

It is an object of the invention to provide a novel blade bag for blades used with a circular saw that can be carried on the belt of a carpenter.

It is also an object of the invention to provide a novel blade bag for blades used with a circular saw that can be installed in a conventional tool pouch.

It is another object of the invention to provide a novel blade bag for blades used with circular saw that can be fabricated from leather, canvas, and other materials.

It is an additional object of the invention to provide a novel blade bag for blades used with a circular saw that is economical to manufacture and market.

SUMMARY OF THE INVENTION

Applicant's novel blade bag for blades used with a circular saw has been designed to incorporate a unique double flap structure involving the rear wall member and the front wall member. The rear wall member has a major lower portion and at its top edge is a fold line which forms the lower edge of the rear wall flap member. The front wall member has a lower major portion whose top edge forms the lower edge of the front wall flap member. The blade bag has the front and rear wall members fastened to each other around its perimeter from the opposite ends of the fold line of the front wall member to form a pocket for removably receiving one or more saw blades for a circular saw.

The saw blades have a height approximating the height of the lower major portion of the rear wall member. When the blade is inserted into the pocket of the blade bag, most of the top half of the saw blade is inaccessible. In its open state, the rear wall flap member is folded upwardly and the front wall flap member is folded downwardly. In its closed state, the front wall flap member is folded upwardly and substantially hides from view the saw blades stored in the blade bag. The rear wall flap member is folded downwardly and fastening structure secures it to the front surface of the front wall flap member. If it wasn't for the unique double flap structure, it would be difficult to grasp the top of the saw blades while in their pocket in order to remove them since conventional bags only have a single top flap member.

The blade bag may be made from leather, canvas, or other types of material. The front and rear wall members may be stitched or riveted together in the critical area around the perimeter of the lower major portion of the front wall member. The outer configuration of the blade bag could have square lower corners or curved corners depending on the preference of the user.

Formed on the inner surface of the front wall flap member is a wrench pocket assembly for receiving a ½ inch open end wrench that is for removing a blade from a circular saw. The wrench pocket assembly may be open at both of its ends. It may be formed integrally with the top edge of the front wall flap member by having hook and loop fastener structure for opening and closing the lower end of wrench pocket assembly.

A belt loop assembly may be formed on the rear surface of the rear wall member. It may be structurally secured at its top end and have hook and loop fastener structure at its lower end which allows the blade bag to be installed on a carpenter's belt without the need for him to remove his belt from his waist.

An alternative embodiment of the blade bag uses multiple divider walls between the front and rear wall members of the blade bag. This produces multiple pockets for storing blades. Another embodiment shows the blade bag installed in the storage chamber of a tool pouch.

DESCRIPTION OF THE PREFERRED EMBODIMENT

Figure 1:
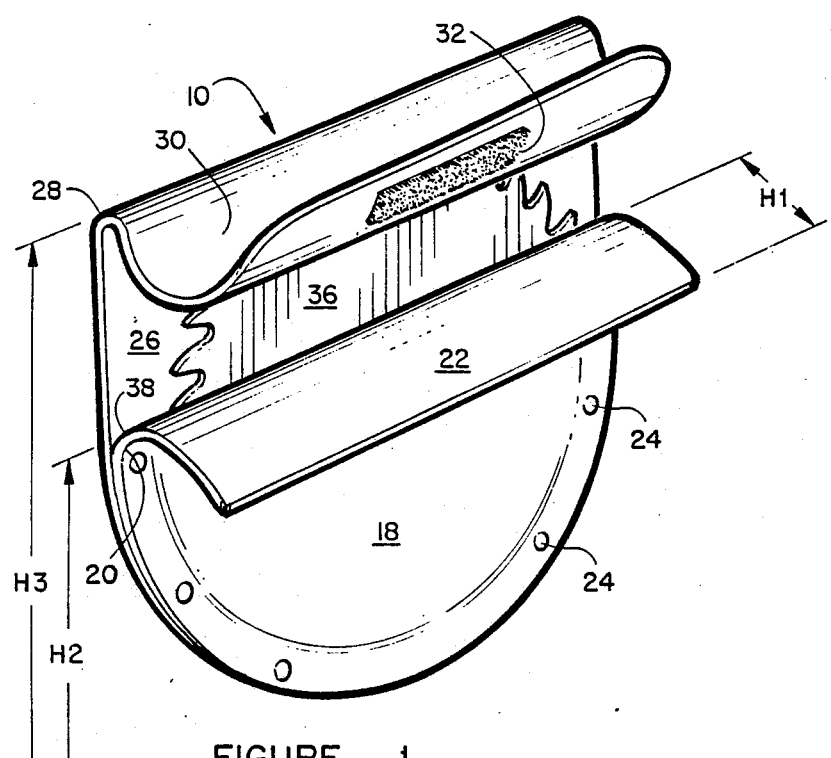
FIG. 1 is a front perspective view of applicant's novel blade bag for use with blades used with a circular saw.
Figure 2:
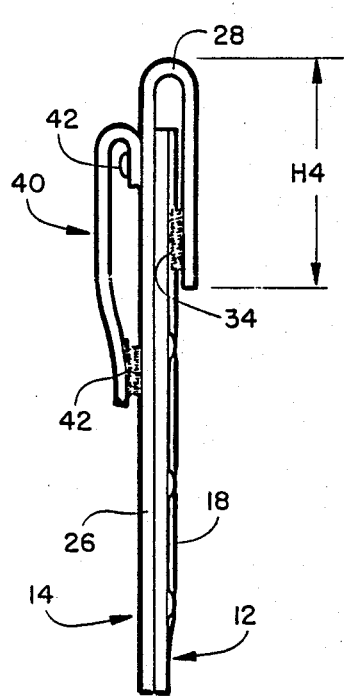
FIG. 2 is a side elevation view of the blade bag illustrated in FIG. 1.

Applicant's novel blade bag for use with blades used with a circular saw will now be described by referring to FIGS. 1-7 of the drawings. The blade bag is generally designated numeral 10.

Blade bag 10 has a front wall member 12 and a rear wall member 14. Front wall member 12 has a fold line 20 at the top edge of lower major portion 18 which has a height H2. Front wall member 12 also has a front wall flap member 22 whose height is H1.

Front wall member 12 is secured to rear wall member 14 by rivets 24 or stitching that runs along the outer perimeter of lower major portion 18.

Rear wall member 14 has a major lower portion 26 having a fold line 28 formed adjacent its top end and its height is H3. Rear wall flap member 30 has hook and loop type fastener structure 32 secured to its front surface that mates with hook and loop fastener structure 34 attached to the front surface of front wall flap member 22. The height of rear wall flap member is H4.

A saw blade 36 is removably stored in pocket 38.

Belt loop assembly 40 has its top end secured by a rivet 42 or other fastening structure to the rear surface of rear wall member 14. The lower end of belt loop assembly 40 has hook and loop type fastener structure 42 secured to the respective belt loop assembly in the rear surface of rear wall member 14.

Figure 3:
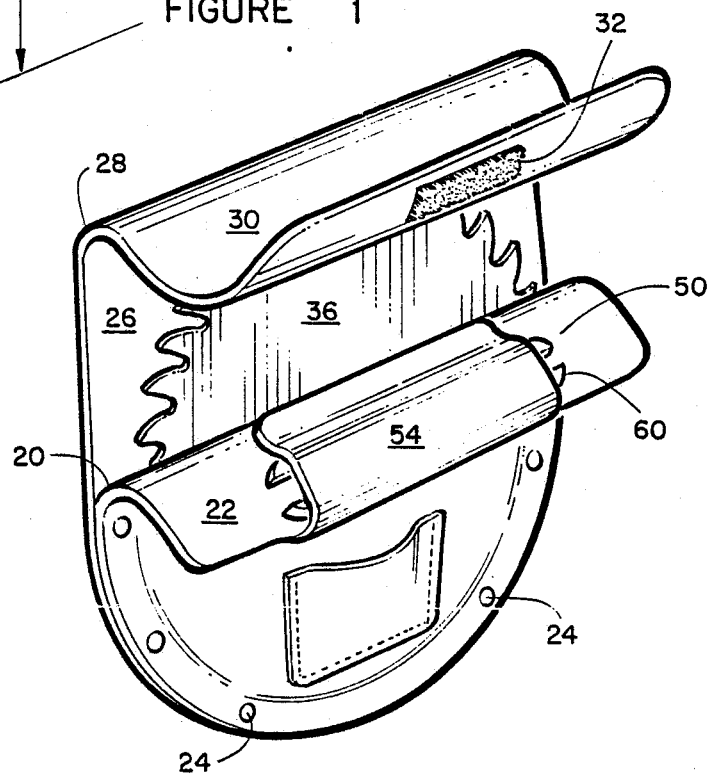
FIG. 3 is a first alternative embodiment of applicant's novel blade bag.
Figure 4:
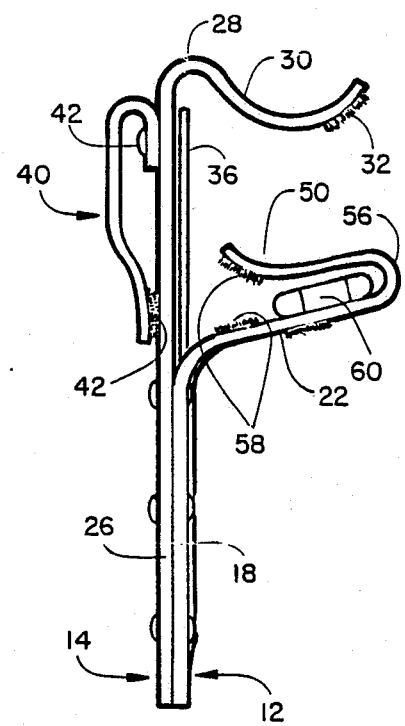
FIG. 4 is a side elevation view of the blade bag illustrated in FIG. 3 with its double flap structure in its open state.

In the embodiment of the blade bag illustrated in FIGS. 3 and 4, a wrench pocket assembly 50 is formed on the rear surface of front wall flap member 22. It has an integrally formed rear flap member 54 that extends from fold line 56. The free end of rear flap member 54 has hook and loop fastener structure 58 which is easily opened in order to remove an open end wrench 60 therefrom.

Figure 5:
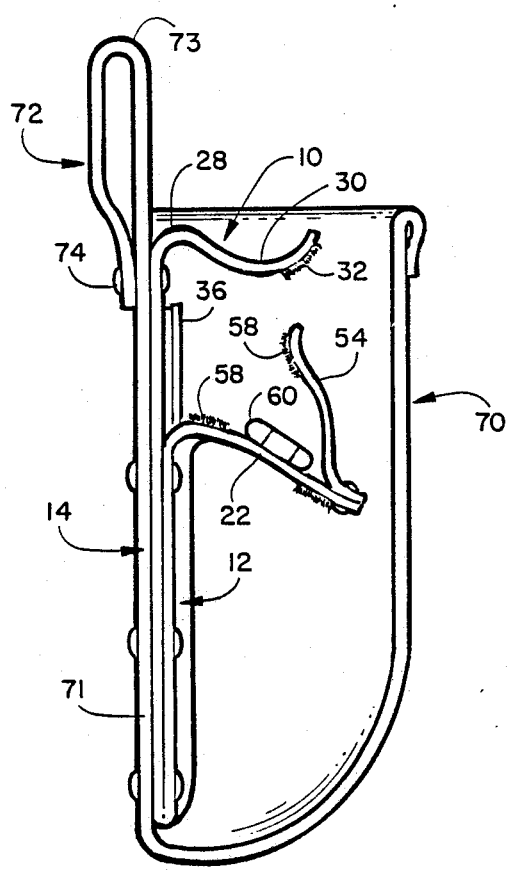
FIG. 5 is a side cross sectional view illustrating applicant's novel blade bag mounted in a tool pouch.

Another embodiment of the novel blade bag is illustrated in FIG. 5 as being installed in a storage chamber 8 formed in a tool pouch 70. The tool pouch 70 has a rear wall 71 having a belt loop assembly 72 extending from its upper end. The belt loop assembly has a fold line 73 and a rivet 74 fastens it to form a closed loop. Rear wall 14 of the blade bag 10 is secured to the front surface of rear wall member 71 of tool pouch 70.

Figure 6:
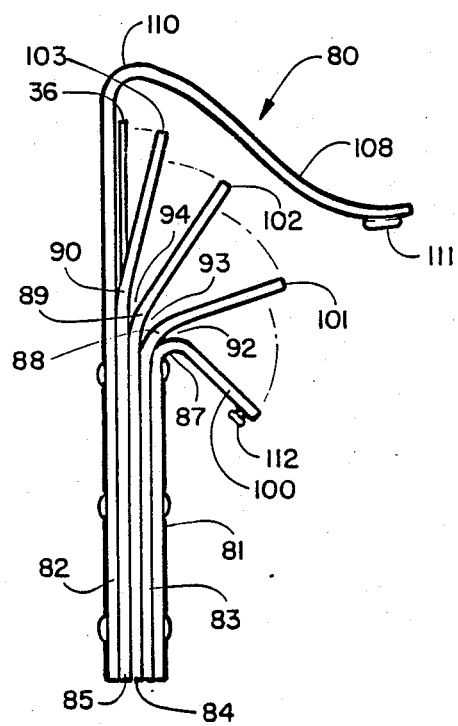
FIG. 6 is a second alternative embodiment of applicant's novel blade bag showing the use of multiple divider walls to form multiple pockets.
Figure 7:
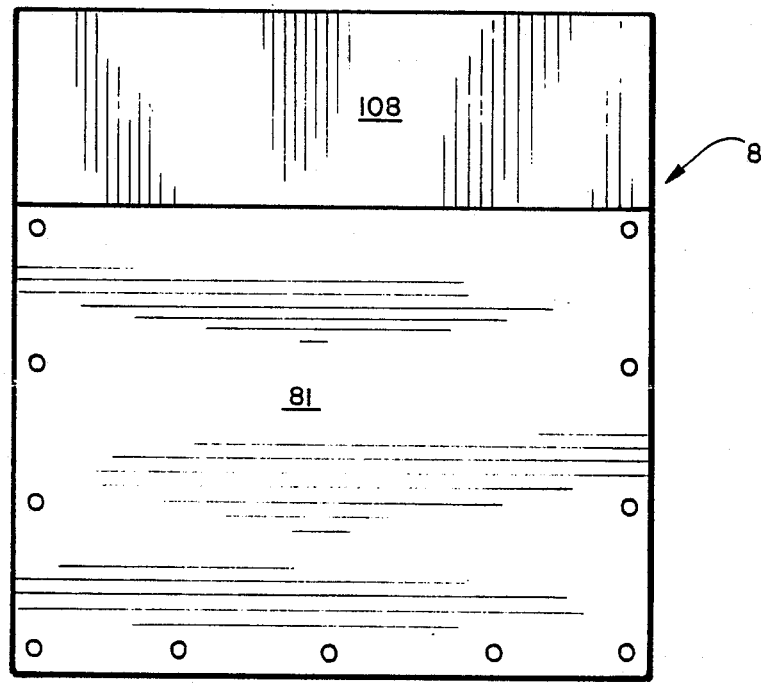
FIG. 7 is a front elevation view of the alternative embodiment blade bag illustrated in FIG. 6.

Another alternative embodiment of the blade bag is illustrated in FIGS. 6 and 7. It has a front wall member 81 and a rear wall member 82. Additionally it has divider wall 83, 84, and 85. These respective wall members have respective fold lines 87, 88, 89, and 90. They in turn form pockets 92, 93, 94, and 95. Flap members 100, 101, 102, and 103 function in the same manner as front wall flap member 22 of blade bag 10. A rear wall flap member 108 extends from fold line 110. Fasteners 111 and 112 secure rear wall flap member in its closed position.

What is claimed is:

1. A blade bag for blades used with a circular saw comprising:
   a rear wall member having a top edge, a bottom edge, a front surface and a rear surface, said rear wall member having a predetermined height and also a perimeter;
   said rear wall member having a lower major portion whose top edge is a fold line, a rear wall flap member is formed from said fold line to the top edge of said rear wall member;
   a belt loop assembly secured to the rear surface of said rear wall member;
   a front wall member having a top edge, a bottom edge, a front surface and a rear surface, said front wall member having a predetermined height and also a perimeter;
   said front wall member having a lower major portion whose top edge is a fold line, a front flap member is formed from said fold line to the top edge of said front wall member;
   said front and rear wall members being aligned against each other with their respective bottom edges being adjacent each other;
   primary fastening means for securing said front and rear wall members together from the opposite ends of the fold line of said front wall member downwardly around their respective lower perimeters that includes their bottom edges to form a pocket between them for removably receiving one or more blades for a circular saw;
   the front flap member of said front wall member in its closed position extends upwardly parallel to the lower major portion of said rear wall member so that its top edge approximates the height of the saw blades stored in said blade bag, said front flap member is folded forwardly and downwardly about its fold line to its open position which exposes the saw blades stored therein thus making them easily removably; and
   the rear wall flap member in its closed position extends downwardly over the front surface of the front flap member of said front wall member, in its open position it is folded upwardly about its fold line, thus allowing the flap member of said front wall member to be folded forwardly.

2. A blade bag as recited in claim 1 wherein said primary fastening means are a plurality of spaced apart rivets.

3. A blade bag as recited in claim 1 wherein said front and rear wall members are made of leather material.

4. A blade bag as recited in claim 1 further comprising hook and loop fasteners for securing the rear surface of the rear wall flap member to the front surface of said front flap member.

5. A blade bag as recited in claim 1 in combination with a tool pouch having a rear wall having a front surface, said tool pouch having an open top end storage chamber, said blade bag being positioned in said open top end storage chamber with its rear wall member secured to the front surface of the rear wall member of said tool pouch.

6. A blade bag for blades used with a circular saw comprising:
   a rear wall member having a top edge, a bottom edge, a front surface and a rear surface, said rear wall member having a predetermined height and also a perimeter;
   said rear wall member having a lower portion whose top edge is a fold line, a rear wall flap member is formed from said fold line to the top edge of said rear wall member;
   a front wall member having a top edge, a bottom edge, a front surface and a rear surface, said front wall member having a predetermined height and also a perimeter;
   said front wall member having a lower major portion whose top edge is a fold line, a front flap member is formed from said fold line to the top edge of said front wall member;
   a wrench pocket assembly secured to the rear surface of the front flap member of said front wall member;
   said front and rear wall members being aligned against each other with their respective bottom edges being adjacent each other;
   primary fastening means for securing said front and rear wall members together from the opposite ends of the fold line of said front wall member downwardly around their respective lower perimeters that includes their bottom edges to form a pocket between them for removably receiving one or more blades for a circular saw;
   the front flap member of said front wall in its closed position extends upwardly parallel to the lower major portion of said rear wall member so that its top edge approximates the height of the saw blades stored in said blade bag, said front flap member is folded forwardly and downwardly about its fold line to its open position which exposes the saw blades stored therein thus making them easily removable; and
   the rear wall flap member in its closed position extends downwardly over the front surface of the front flap member of said front wall member, in its open position it is folded upwardly about its fold line, thus allowing the front flap member of said front wall member to be folded forwardly.

7. A blade bag for blades used with a circular saw comprising:

a rear wall member having a top edge, a bottom edge, a front surface and rear surface, said rear wall member having a predetermined height and also a perimeter;

said rear wall member having a lower major portion whose top edge is a fold line, a rear wall flap member is formed from said fold line to the top edge of said rear wall member;

a front wall member having a top edge, a bottom edge, a front surface and a rear surface, said front wall member having a predetermined height and also a perimeter;

said front wall member having a lower major portion whose top edge is a fold line, a front flap member is formed from said fold line to the top edge of said front wall member;

said front and rear wall members being aligned against each other with their respective bottom edges being adjacent each other;

primary fastening means for securing said front and rear wall members together from the opposite ends of the fold line of said front wall member downwardly around their respective lower perimeters that includes their bottom edges to form a pocket between them for removably receiving one or more blades for a circular saw;

at least one divider wall intermediate said front wall member and said rear wall member to form a plurality of saw blade pockets;

the front flap member of said front wall member in its closed position extends upwardly parallel to the lower major portion of said rear wall member so that its top edge approximates the height of said saw blades stored in said blade bag, said front flap member is folded forwardly and downwardly about its fold line to its open position which exposes the saw blades stored therein thus making them easily removable;

the rear wall flap member in its closed position extends downwardly over the front surface of the front flap member of said front wall member, in its open position it is folded upwardly about its fold line, thus allowing the front flap member of said front wall member to be folded forwardly.

* * * * *